3,345,286
PROCESS FOR REMOVING NITROGEN WITH COBALT-RARE EARTH AND GROUP VI CATALYST
Stephen M. Kovach, Highland, Ind., and Edward S. Rogers, Hinsdale, Ill., assignors to Sinclair Research, Inc., New York, N.Y., a corporation of Delaware
No Drawing. Filed Aug. 26, 1965, Ser. No. 482,917
11 Claims. (Cl. 208—254)

This invention relates to the hydrorefining of mineral hydrocarbons such as petroleum, coal tar or shale oil hydrocarbons which in many cases contain impurities and particularly relates to a cerium or thorium promoted cobalt-containing catalyst especially suited for the hydrorefining of these hydrocarbon stocks. The catalyst of this invention exhibits unusually high activity for denitrogenation, desulfurization and hydrogenation of olefins and aromatics of the hydrocarbon fractions.

The presence of sulfur and nitrogen in mineral hydrocarbon oils has long been recognized as undesirable. Nitrogen compounds have a poisoning effect as they often tend to reduce or destroy the activity of catalysts employed to convert, e.g. crack, these stocks. The higher the nitrogen content of the charge stock, the higher will be the temperature required to effect a given amount of conversion, said higher temperature requiring more frequent regeneration or replacement of the catalyst. Sulfur compounds are highly objectionable in hydrocarbon oils as they have an unpleasant odor, tend to cause corrosion and often lead to sludging. These difficulties have led to various proposals for desulfurization and denitrogenation of almost all petroleum, coal tar and shale oil hydrocarbons which are normally liquid or which can be made fluid at treating temperatures, including light distillates, middle and heavy distillates and even residual stocks. For instance, prior methods have included acid treatment, deasphalting and hydrogenolysis in contact with catalytic material such as molybdenum sulfide, tungsten oxide, nickel sulfide, tungsten sulfide, cobalt molybdate, nickel molybdate, etc. This latter hydrogenation treatment has become commonly known as hydrorefining or hydrofining. Such hydrogen treatment of the feedstocks has become widely accepted, but by and large the catalysts have been found to effect hydrogenation and denitrogenation at high rates but desulfurization at much slower rates or vice versa. For example, experience has shown that, whereas supported nickel catalysts are more active for hydrogenation-denitrogenation than the corresponding cobalt catalysts, the cobalt catalysts are superior to nickel catalysts in desulfurization.

It is an object of this invention to devise a method of hydrorefining mineral hydrocarbons for the removal of sulfur and nitrogen contaminants and the hydrogenation of olefins and aromatics therein, in an efficient manner. Another object is to provide a cobalt-containing hydrodesulfurization catalyst which will effect high rates of hydrogenation and denitrogenation of hydrocarbon feedstocks.

These and other objects of the present invention are attained by the hydrogen treatment of the hydrocarbon feed, under hydrogenation conditions, in the presence of a catalyst consisting essentially of minor, catalytically effective amounts of cobalt, cerium or thorium and molybdenum or tungsten, on an inorganic oxide support. We have discovered that the addition of cerium or thorium as a promoter to cobalt-molybdenum or cobalt-tungsten catalysts on inorganic oxide supports increased their hydrogenation-denitrogenation activities to equal to or better than that obtained with the conventional nickel-containing catalysts. This promoting effect of cerium and thorium was observed to be present with the cobalt-containing catalysts but not with nickel or iron-containing catalysts.

In accordance with the present invention our catalyst compositions often contain about 1 to 8% by weight of cobalt, calculated as metal, about 1 to 8% by weight of cerium or thorium, calculated as $CeO_2$ or $ThO_2$, and about 4 to 30% by weight of molybdenum, or tungsten calculated as $MoO_3$ or $WO_3$, on an inorganic oxide support, the weight ratio of cobalt to $CeO_2$ or $ThO_2$ being from about 0.5/1 to 4/1. Preferably the catalysts will contain about 2 to 4% by weight of cobalt calculated as metal, about 2 to 4% by weight of cerium or thorium calculated as dioxides, and about 10 to 20% by weight of molybdenum or tungsten calculated as their trioxides, the preferred ratio of cobalt to $CeO_2$ or $ThO_2$ being about 1/1.

The catalyst support may be any of the inorganic oxides commonly employed as carriers for metallic hydrogenation catalysts, e.g. alumina, silica, silica-alumina, boria-alumina, etc. A predominantly alumina support is preferred. If an alumina base is employed it can be made from any of the alumina hydrates. The hydrates include the monohydrate, boehmite; the trihydrates, bayerite I, nordstrandite and gibbsite; or another hydrous alumina which appears to be amorphous and preferably the hydrates which contain a major portion or consist essentially of boehmite may be employed. Calcination converts these hydrates to an activated or gamma family type alumina, e.g. gamma, delta, eta, chi, etc., depending on the composition of the hydrate and choice of calcination conditions. The alumina hydrate can be prepared by any of the conventional methods, for example, an aqueous solution of aluminum chloride or other acidic aluminum salt can be reacted with aqueous ammonium hydroxide to precipitate an essentially boehmite or amorphous alumina hydrate. This material can be washed to remove chloride and ammonium ions.

At the time of addition of the promoting metal the alumina can be activated or a hydrate in the form of dried or undried alumina hydrate or alumina hydrogel in gelatinous form dried sufficiently to afford discrete particles; in any event, finely divided particles, e.g. passing about 100 or even 200 mesh (Tyler) for the most part, such as spray dried microspheres are preferred. Such alumina supports are usually characterized by a large surface area ranging from about 60 to 600 or more square meters per gram, preferably between about 150 and 300 square meters per gram as determined by the BET method. The higher surface area aluminas, e.g., about 350–500 m.$^2$/g., may be less desirable for the hydrorefining of the heavier oils. The aluminas may also have a relatively large content of pore volume in the pore size range of about 20 to 100 angstrom units, of the order of greater than 0.3, preferably greater than 0.6, cc. per gram of pore volume in pores of this size, although mechanical steps of forming the catalyst into pellets, as by tabletting or extruding, may affect the amount of pore volume of this size. Typical alumina based catalysts made from boehmite alumina may have essentially no pores greater than about 50 angstrom units in size and have pore distributions which are similar to those of silica-alumina. On the other hand, the catalysts made from aluminas containing high percentages of the crystalline trihydrates in the precursor alumina mixtures have considerable port volume in the 100 to 1000 angstrom units pore size range. These large pores do not occur in many alumina bases derived from the boehmite or monohydrate form of precursor alumina, either before or after calcination. The boehmite type of precursor alumina is often characterized by crystallite size of the order of 40 angstrom units before and after calcination and contains no pores larger than 50 angstrom units.

Several methods well known to those skilled in the art are applicable for preparation of the catalysts of this invention. The cerium and/or thorium, the molybdenum and/or tungsten and the cobalt may be combined with the inorganic oxide support in any sequence or in any component admixture. Advantageously, the molybdenum or tungsten can first be applied to the support in the form of a monolayer of the trioxide after which the cobalt and cerium or thorium can be applied to the substrate simultaneously. Various means of application may be used such as impregnation or coprecipitation. The oxide support may be impregnated by a solution of soluble salts of the catalytically active metals or by hydrothermal digestion, where substantially water-insoluble salts, e.g., the carbonates, are heated in water with the trioxide of molybdenum or tungsten in the presence of the support material to form mixed molybdates or tungstates of cerium or thorium and cobalt on the surface of the support. Advantageously, the metal components may be deposited on the support via an aqueous medium either as water-soluble compounds in solution, although an excess of the water-soluble materials may be present to give a slurry, or as relatively water-insoluble compounds in slurry form. In the impregnation of the substrate the cobalt, cerium or thorium and molybdenum or tungsten are in the form of compounds or salts which may be converted to the oxide form upon calcination. Calcination or activation of the impregnated product may be conducted at temperatures of up to about 1400° F., usually at least about 750° F., preferably from about 900 to 1100° F., in an atmosphere such as air.

The catalysts of this invention are particularly active when the activating metals in the oxide form are converted to the sulfides. The sulfiding step generally comprises passing hydrogen sulfide, either pure or diluted with another gas such as, for instance, hydrogen over a bed of the metal-activated catalyst, which may be in the oxide form as obtained from the calcination step, at temperatures usually from about 300 to 850° F., preferably from 500 to 750° F., for a time sufficient to convert a significant portion of the catalytic metal oxides to their respective sulfides. Alternatively, the catalyst may be sulfided by the processing of a sulfur-containing feed. Air should be excluded from the catalyst after the sulfiding step.

In accordance with the present invention the hydrogen treatment of the feedstock is conducted under hydrogenation conditions; generally a temperature of about 400 to 800° F., preferably about 500 to 750° F. Other conditions may include a pressure of about 0 to 10,000 pounds per square inch gauge (p.s.i.g.), preferably about 10 to 3,000 p.s.i.g., a weight hourly space velocity of feed to catalyst (WHSV) of about 0.1 to 10, preferably about 0.25 to 5 WHSV, and a molar ratio of hydrogen to hydrocarbon of about 1 to 20, preferably about 1 to 10.

A typical ceria-promoted cobalt molybdate on alumina catalyst of this invention was prepared as follows:

To 154 g. of boehmite alumina microspheres was added 185 ml. of a solution consisting of 25 g. of molybdic acid (analyzing 87.8% $MoO_3$), 12 ml. of concentrated ammonium hydroxide (28%) and the remainder deionized water. The resulting catalyst was oven dried and then calcined in air for 3 hours at 1200° F. and yielded a 16% $MoO_3$ on $Al_2O_3$ catalyst.

To 15 g. of the 16 $MoO_3$-$Al_2O_3$ catalyst was added 22.5 ml. of a solution containing 2.96 g. of $$Co(NO_3)_2 \cdot 6H_2O$$

(cobaltous nitrate), 1.94 g. of $Ce(NO_3)_3 \cdot 6H_2O$ (cerous nitrate) and the remainder deionized water. After impregnation the catalyst was oven dried and calcined in air for 3 hours at 900° F. The resulting catalyst composition analyzed 4% Co, 4% $CeO_2$, 16% $MoO_3$ and the balance $Al_2O_3$.

The following test procedure was used to determine the hydrogenation and denitrogenation activities of the catalysts of this invention and analogous catalysts of the prior art:

The catalyst to be tested was crushed and screened to 30 mesh or finer and placed in a 300 cc. autoclave. Pretreatment of the catalyst consisted of evacuation of the bomb with house vacuum and pressuring with 250 p.s.i.g. hydrogen sulfide for 10 minutes at room temperature with stirring (600 r.p.m.). This system was depressured to 50 p.s.i.g. hydrogen sulfide and heating started with stirring (1000 r.p.m.). The temperature was raised from room temperature to 600° F. overnight (ca. 16 hours). At this point stirring was stopped, hydrogen was admitted to a total pressure of 1000 p.s.i.g., 95 ml. of 1-methylnaphthalene containing 100 p.p.m. N as quinoline was pressured from a blowcase to the bomb and the stirring (1000 r.p.m. restarted. The system was such that a continued pressure of 1000 p.s.i.g. hydrogen was on the contents of the bomb at all times. At intervals of 30 minutes or multiples thereof a small sample (2–3 ml.) was withdrawn from the bomb and a refractive index taken on the sample. When the refractive index reached $n_D^{25}=1.5800$ (representing approximately 50% hydrogenation to the tetralin stage with decalin production nil) the heat, hydrogen and stirring were shut off and the bomb was cooled to room temperature. The bomb was dismantled and the hydrocarbon separated from the catalyst by filtration. Products were submitted for total nitrogen (p.p.m.) analysis to determine denitrogenation activity.

Using the above procedure a conventional nickel-molybdena-alumina catalyst, known for its excellent hydrogenation-denitrogenation activity, was tested and employed as the baseline catalyst. By assigning values of 1.00 to both the hydrogenation and denitrogenation activities thereof a relation is set up by which the hydrogenation and denitrogenation activities of the catalysts of

TABLE I

|  | Run | | | | | |
|---|---|---|---|---|---|---|
|  | 1 | 2 | 3 | 4 | 5 | 6 |
|  | Catalyst | | | | | |
|  | 4% Ni-16% $MoO_3$-$Al_2O_3$ | 4% Co-16% $MoO_3$-$Al_2O_3$ | 4% Co-2% $CeO_2$-16% $MoO_3$-$Al_2O_3$ | 4% Co-4% $CeO_2$-16% $MoO_3$-$Al_2O_3$ | 4% Co-4% $ThO_2$-16% $MoO_3$-$Al_2O_3$ | 4% Co-4% $ThO_2$-16% $MoO_3$-$Al_2O_3$ |
| Weight of catalyst, grams | 3.0 | 3.0 | 3.0 | 3.0 | 3.0 | 3.0 |
| Time (minutes) to reach $n_D^{25}=1.5800$ | 222 | 300 | 245 | 170 | 168 | 170 |
| Relative Rates: |  |  |  |  |  |  |
| Hydrogenation | 1.00 | 0.74 | 0.90 | 1.31 | 1.32 | 1.30 |
| Denitrogenation | 1.00 | 0.67 | 0.83 | 1.13 | 1.24 | 1.40 | this invention can be compared to activities of similar and prior art catalysts. These comparisons appear in the tables. Run 1 is the baseline catalyst; of the original 100 p.p.m. of nitrogen present in the feed, the baseline catalyst effected the removal of all but about 8.5 p.p.m. N.

Runs 1 and 2, respectively, employed conventional nickel-containing and cobalt-containing catalysts of the prior art. It is noted that the cobalt catalyst is less effective for both hydrogenation and denitrogenation than the corresponding nickel catalyst. In Run 3, 2% $CeO_2$ was impregnated on the prior art cobalt-molybdena-alumina catalyst and showed an improvement in both hydrogenation and denitrogenation. In Run 4, the cobalt and ceria were added together to a molybdena-alumina catalyst yielding a catalyst having a hydrogenation-denitrogenation activity superior to that of the baseline nickel-containing catalyst. Runs 5 and 6 show the effect of thoria as a promoter. Its hydrogenation rates are comparable to those of cerium but thorium exhibits a higher denitrogenation rate. Runs 5 and 6 employed the same catalyst compositions except that Run 5 used 3 grams of an original 10 gram preparation and Run 6 used 3 grams of an original 50 grams preparation.

Since ceruim and thorium were observed to be promoters for cobalt-containing catalysts their effects on catalysts containing other members of the cobalt family, i.e., nickel and iron, were tested. The results appear in Table II.

As can be readily determined from Table III, cerium has no promoter effect with cobalt-alumina or molybdena-alumina catalysts. In fact, their denitrogenation activities are considerably decreased.

The catalysts of the present invention have been found to be useful for the removal of impurities and for the hydrogenation of unsaturated, i.e. olefinic and aromatic, hydrocarbons from a wide range of petroleum, coal tar and shale oil fractions for the production of chemicals, lubricating oils and fuels. The catalysts of the present invention can be used for treating mineral hydrocarbon stocks comprising base stocks for lubricants, lighter petroleum distillates such as a gas oil for catalytic cracking and hydro-cracking, wax distillates from paraffin crudes, catalytically cracked distillates, coal tar distillates and the like. These catalysts have been found effective for the pretreatment of feedstocks for catalytic cracking including reduction in the concentration of sulfur, oxygen and nitrogen compounds, and of components which tend to produce excessive quantities of carbonaceous deposits in catalytic cracking, as well as the hydrogenation of such stocks to improve conversion and selectivity in catalytic cracking. These catalysts are especially useful in the hydrorefining of hydrocarbon stocks boiling in a higher range than that of gasoline, i.e. greater than about 70–90° C.

We claim:
1. A process for hydroefining nitrogen-contaminated mineral hydrocarbons which consists essentially of contacting said hydrocarbons at a temperature of about 400 to 800° F. with molecular hydrogen under hydrogenation conditions in the presence of a catalyst consisting essentially of a calcined composition containing minor, catalytically effective amounts of (1) cobalt, (2) a promotor selected from the group consisting of cerium

TABLE II

| | Run | | | |
|---|---|---|---|---|
| | 1 | 7 | 8 | 9 |
| | Catalyst | | | |
| | 4% Ni-16% $MoO_3$-$Al_2O_3$ | 4% Ni-4% $CeO_2$-16% $MoO_3$-$Al_2O_3$ | 4% Co-16% $MoO_3$-12% $Fe_2O_3$-$Al_2O_3$ | 4% Co-4% $ThO_2$-16% $MoO_3$-12% $Fe_2O_3$-$Al_2O_3$ |
| Weight of catalyst, grams | 3.0 | 3.0 | 3.0 | 3.0 |
| Time (minutes) to reach $n_D^{25}=1.5800$ | 222 | 230 | 650 | 750 |
| Relative Rates: | | | | |
| Hydrogenation | 1.00 | 0.96 | 0.34 | 0.30 |
| Denitrogenation | 1.00 | 0.96 | 1.15 | 0.79 |

As shown in Table II the addition of cerium or thorium to nickel or iron-containing catalysts decreases their hydrogenation-denitrogenation activities.

Since cerium and thorium were observed to be promoters for cobalt-molybdena-alumina catalysts their effects on the individual components were tested. The results are shown in Table III.

TABLE III

| | Run | | | | | | |
|---|---|---|---|---|---|---|---|
| | 1 | 3 | 10 | 11 | 12 | 13 | 14 |
| | Catalyst | | | | | | |
| | 4% Ni-16% $MoO_3$-$Al_2O_3$ | 4% Co-4% $CeO_2$-16% $MoO_3$-$Al_2O_3$ | 16% $MoO_3$-$Al_2O_3$ | 4% $CeO_2$-16% $MoO_3$-$Al_2O_3$ | 20% Co-$Al_2O_3$ | 43% Co-$Al_2O_3$ | 4% Co-4% $CeO_2$-$Al_2O_3$ |
| Weight of catalyst, grams | 3.0 | 3.0 | 3.0 | 3.0 | 3.0 | 3.0 | 3.0 |
| Time (minutes) to reach $n_D^{25}=1.5800$ | 222 | 170 | 400 | 400 | >1,000 | >1,000 | >1,000 |
| Relative Rates: | | | | | | | |
| Hydrogenation | 1.00 | 1.31 | 0.55 | 0.55 | <0.22 | <0.22 | <0.22 |
| Denitrogenation | 1.00 | 1.13 | 0.96 | 0.59 | 0.81 | 0.91 | 0.29 | and thorium and (3) a metal selected from the group consisting of molybdenum and tungsten, on a predominantly alumina support.

2. The process of claim 1 wherein the catalyst contains about 1–8 weight percent of cobalt, calculated as Co, about 1–8 weight percent of promoter, calculated as the dioxide, and about 4–30 weight percent of said metal, calculated as the trioxide, the weight ratio of cobalt to promotor being from about 0.5/1 to 4/1.

3. The process of claim 2 wherein the catalyst is sulfided.

4. The process of claim 3 wherein the catalyst contains about 2–4 weight percent of cobalt, about 2–4 weight percent of promoter and about 10–20 weight percent of said metal, the weight ratio of cobalt to promoter being about 1/1.

5. The process of claim 3 wherein the hydrogenation conditions include a temperature of about 500–750° F., a pressure of about 100–3,000 p.s.i.g., a weight hourly space velocity of about 0.25–5 WHSV and a molar ratio of hydrogen to hydrocarbon feed of about 1/1 to 10/1.

6. A catalyst consisting essentially of a calcined composition of minor, catalytically effective amounts of (1) cobalt, (2) a promoter selected from the group consisting of cerium and thorium and (3) a metal selected from the group consisting of molybdenum and tungsten, on (4) a predominantly alumina support.

7. The catalyst of claim 6 wherein the cobalt is present in amounts from about 1–8 weight precent, calculated as Co, the promoter in amounts from about 1–8 weight percent, calculated as the dioxide, and said metal in amounts from about 4–30 weight percent, calculated as the trioxide, the weight ratio of cobalt to promoter being from about 0.51 to 4/1.

8. The catalyst of claim 6 wherein the cobalt is present in amounts from about 2–4 weight percent, the promoter in amounts from about 2–4 weight percent and said metal in amounts from about 10–20 weight percent, the weight ratio of cobalt to promoter being about 1/1.

9. The catalyst of claim 7 wherein the catalyst contains ceria and molybdena.

10. The process of claim 1 wherein the metal is molybdenum.

11. The process of claim 3 wherein the metal is molybdenum.

References Cited

UNITED STATES PATENTS

| | | | |
|---|---|---|---|
| 2,864,363 | 8/1958 | Folkins | 208—136 |
| 2,897,135 | 7/1959 | Doumani | 208—136 |

DELBERT E. GANTZ, *Primary Examiner.*

S. P. JONES, *Assistant Examiner.*

UNITED STATES PATENT OFFICE

CERTIFICATE OF CORRECTION

Patent No. 3,345,286                           October 3, 1967

Stephen M. Kovach et al.

It is hereby certified that error appears in the above numbered patent requiring correction and that the said Letters Patent should read as corrected below.

Column 2, line 66, for "port" read -- pore --; column 3, line 54, for "10 to 3,000 p.s.i.g." read -- 100 to 3,000 p.s.i.g. --; column 4, line 37, for "(1000 r.p.m." read -- (1000 r.p.m.) --; columns 3 and 4, TABLE I, sixth column, in the heading thereof, for "4% Co-" read -- 4% CoO --; column 8, line 7, for "0.51" read -- 0.5/1 --; line 22, for "2,864,363" read -- 2,846,363 --.

Signed and sealed this 7th day of January 1969.

(SEAL)
Attest:

Edward M. Fletcher, Jr.                           EDWARD J. BRENNER
Attesting Officer                                    Commissioner of Patents